United States Patent [19]
Dario et al.

[11] Patent Number: 4,555,953
[45] Date of Patent: Dec. 3, 1985

[54] COMPOSITE, MULTIFUNCTIONAL TACTILE SENSOR

[76] Inventors: Paolo Dario, Via Saffi 35, Livorno; Danilo E. De Rossi, Via Del Cantone 41, S. Giuliano Terme (Pisa), both of Italy

[21] Appl. No.: 600,738

[22] Filed: Apr. 16, 1984

[51] Int. Cl.$^4$ ............................ G01L 1/16; G01L 5/16
[52] U.S. Cl. ................................ 73/862.04; 73/432 T; 73/862.68; 310/338; 310/800; 901/33
[58] Field of Search ............ 73/862.04, 862.68, 432 T; 310/338, 800; 374/177; 901/33, 46

[56] References Cited

U.S. PATENT DOCUMENTS

| | | | |
|---|---|---|---|
| 3,751,733 | 8/1973 | Fletcher et al. | 901/33 X |
| 4,014,217 | 3/1977 | Lagasse et al. | 73/862.04 X |
| 4,302,138 | 11/1981 | Zarudiansky | 901/33 X |
| 4,328,441 | 5/1982 | Kroeger, Jr. et al. | 310/800 X |
| 4,348,611 | 9/1982 | Ruppel et al. | 361/282 X |
| 4,405,402 | 9/1983 | Quilliam | 310/800 X |
| 4,471,369 | 9/1984 | Anthony et al. | 357/26 |
| 4,491,760 | 1/1985 | Linvill | 310/800 X |

FOREIGN PATENT DOCUMENTS

| | | | |
|---|---|---|---|
| 2497345 | 7/1982 | France | 310/338 |
| 2115935 | 9/1983 | United Kingdom | 73/862.04 |
| 0643322 | 1/1979 | U.S.S.R. | 901/46 |
| 0863332 | 9/1981 | U.S.S.R. | 901/33 |

OTHER PUBLICATIONS

Fukada et al., "Piezoelectricity and Ferroelectricity in Polyvinylidene Fluoride", Ultrasonics, vol. 19, No. 1, Jan. 1981, pp. 31–39.

*Primary Examiner*—Charles A. Ruehl
*Attorney, Agent, or Firm*—Sughrue, Mion, Zinn, Macpeak and Seas

[57] ABSTRACT

A device is provided through which a set of information concerning tactile interaction between a manipulator and an object to be recognized is provided to the user. Several configurations are described, based on the piezo- and pyro-electric (ferroelectric) properties of polymeric materials, such as the polymer polyvinylidene fluoride (PVF$_2$ or PVDF), different polypeptides and copolymers of PVF$_2$ and TrFE. By arraying in a proper way various sensing layers, each featured by different sensory capabilities, a laminated sensor structure is obtained, able to provide a set of tactile information. The multilayered structure of the proposed device is inspired to that of the human skin, which includes superficial (epidermal) and deep (dermal) sensors.

27 Claims, 15 Drawing Figures

COMPOSITE, MULTIFUNCTIONAL TACTILE SENSOR

BACKGROUND OF THE INVENTION

1. Field of the Invention

This invention relates to a composite tactile sensing device able to provide a robot with a set of sensory capabilities comparable to those provided by the human skin.

Present generations of robots lack most of the sensorial abilities of humans. This limitation prevents industrial robots from being used to carry on delicate tasks of enormous practical relevance (such as assembly operations) and, even more, it prevents the development of evoluted robots for off-factory jobs (agriculture, home, assistance to the disabled, etc.) It is not difficult to anticipate therefore that the next generations of robots will be increasingly featured by the massive use of dedicated sensors which will enhance substantially the limited ability of present robots to interact with the external world. Taction, vision and proximity are the sensory needs that, in combination or alone, are commonly accepted as desirable features of robots. Research on visual pattern recognition received considerable attention in recent years. Tactile sensing did not attract comparable research interest in the past; present state of the art in automated tactile sensing is recognized, in fact, as rather primitive.

Tactile recognition (the ability to recognize objects by manipulation) is an inherently active process. Unlike visual sensors (passive and located remotely from the object), tactile sensors must be put in contact with the object to be recognized and, even more, such contact should be competently organized in order to extract the maximum degree of information from manipulative acts.

Therefore, tactile sensing requires complex system architecture, including evolute tactile sensors, dexterous hands, suitable exploratory strategies, efficient control and advanced signal processing capabilities.

This invention relates to one important aspect of tactile sensing, i.e. the tactile sensor itself. Human tactile sensing undoubtedly represents a useful model for robots, also because the specific needs of robotic tactile sensing are still not well defined. Therefore, it may be convenient to assume the human skin as a model for artificial tactile sensors. An artificial skin sensor should possess, as the natural skin, softness, elasticity and some mechanical resistance. Furthermore, it should detect contact pressure, material hardness, surface texture and slippage. An additional desirable feature of the artificial tactile sensor should be the ability to identify different materials on the basis of their thermal properties.

Presently, no commercial robot is provided with evoluted tactile sensor. Only a few robot grippers possess very simple contact force measuring devices of the strain-gauge type. Most robots only have on-off, microswitch type transducers to assess the contact between the grippers and the object to be grasped. However, various models of tactile sensors have been proposed and developed by several research groups.

A number of different techniques and materials have been utilized for the construction of artificial skin-like sensors, including conductive rubbers, strain gauges, piezo-electric transducers, magnetic and capacitive sensors. See for example the article "A high-resolution image touch sensor", by W. Daniel Hillis, The International Journal of Robotics Research, vol. 1, No. 2, summer 1982, the article "Design and implementation of a VLSI tactile sensing computer" by Marc R. Raibert and John E. Tanner, The International Journal of Robotics Research, vol. 1, No. 3, fall 1982, the article "Conductive elastomers as sensor for industrial parts handling equipment" by Wesley E. Snyder and Joseph St. Clair, IEEE transactions on instrumentation and measurement, vol. IM-27, No. 1, March 1978, the chapter "Interactions involving physical contact between robot and environment: tactile detection", Robot Technology, vol. 2, by Philippe Coiffet, chapter 4, pages 75–89, the article "Torque-sensitive tactile array for robotics", by S. Hackwood et al, The International Journal of Robotics Research, vol. 2, No. 2, summer 1983, and the article "Capacitive impedance readout tactile image sensor", by R. A. Boie, Proceeding of the IEEE Conference on Robotics, March 1984.

Although generally able to provide some degree of information on tactile sensing, none of the previously proposed devices was entirely satisfactory and limitations in terms of robustness, reliability, cost, sensitivity, noise, hysteresis, non-linearity, fatigue, drift and long time constant have been reported. In a different field, an instrument for viscoelastic measurement (see U.S. Pat. No. 4,250,894) has been described, making use of an array of piezo-electric polymer sensors for viscoelastic measurement by palpation. However, such known apparatus does not provide an accurate measurement.

SUMMARY OF THE INVENTION

It is the main object of the present invention to provide a device through which a set of information concerning tactile interaction between a manipulator and an object to be recognized is provided to the user. The user is either a robot along with its central electronic control unit, or a disabled. In the former case, the tactile sensing device is mounted on the fingers of the robotic manupulator ("hand"); in the latter, the tactile sensor is mounted on the fingertip of a hand prosthesis and provides useful information to the central unit of the artificial hand or to the patient himself via his nervous system.

In the present invention, several configurations are described, based on the piezo- and pyro-electric (ferroelectric) properties of polymeric materials, such as the polymer polyvinylidene fluoride ($PVF_2$ or PVDF), different polypeptides and copolymers of $PVF_2$ and TrFE. The major advantages of this class of materials reside in their flexibility and adaptability to various shapes, as well as in the ease to prepare complex arrays of sensors. It is possible, by these materials, to construct skin-like tactile sensors, which possess pyro- and piezoelectric properties similar to those of the human skin.

According to invention, a composite tactile sensing device is provided which comprises a superficial (epidermal) sensing layer, including a first ferroelectric polymer transducer, a deep (dermal) sensing layer, including a second ferroelectric polymer transducer, comprising a film of ferroelectric polymer material and a matrix-like array of electrodes connected to the face of said film which is opposite to the epidermal sensing layer, and an intermediate layer of compliant material, interposed between said epidermal and dermal sensing layers. By arraying in a proper way various sensing layers, each featured by different sensory capabilities, a laminated sensor structure is obtained, able to provide a set of tactile information. The multilayered structure of the proposed device is inspired by that of the human skin, which includes superficial (epidermal) and deep (dermal) sensors.

From a functional point of view, the multilayered sensor configuration is aimed to provide the information that a human being usually obtains during tactile exploration.

The major limitation of ferroelectric transducers in general is the lack of truly static response, but in principle, since tactile object exploration is a dynamic process, piezo- and pyro-electric sensors are able to provide all necessary information for tactile recognition. Nevertheless, the measurement of static pressure can be useful in several ways, for instance for safer object grasp. An additional feature of the present invention is to provide means to measure also static pressure.

For simplicity, the case of a single exploratory finger equipped with the proposed tactile sensor and provided with suitable actuation and control means, is considered. The design of the whole tactile transducer is aimed to the following tactile exploratory strategy. The exploring finger will first define the main gross features of the object by tracking its surface contour in order to detect such features as sharp edges, holes, planes, etc. During this phase, the finger tip should be pressed rather strongly onto the object in order to obtain graded, tactile images; the deep dermal sensing layer is intended to provide this information.

Hardness and viscoelasticity of the material forming the object are measured immediately after by the exploring finger which presses its sensorized fingertip against a suitable planar surface of the object. The exact measurement of the modulus of elasticity of the material requires the knowledge of the relationship between contact pressure and object deformation. This information is provided by the device according to the invention, as will be described later. The finger is then slightly rubbed across the surfaces of the object to detect thier roughness. The thin, highly sensitive, epidermal sensing layer "feels" the fine superficial structure of the object and provides information on surface texture. During this phase the force exerted by the finger on the textured surfaces is very small (usually between 0.3 and 0.8N) and typically the finger describes a sinusoidal movement across the surface.

Finally, the tactile sensor is gently pressed by the exploring finger on the object to assess whether the material "feels" warm or cold. Such capability is peculiar of the human touch sense and derives from the ability of skin thermal receptors, which operate as pyro-electric sensors, to detect heat flow originated by the temperature gradient between the fingertip (at body temperature) and an object (at room temperature), the heat flow through the same skin area and for the same temperature gradient depending upon the thermal conductivity of the material of which the object is made. Time variation of skin temperature, sensed by thermal receptors, depends on the thermal diffusivity of object material (which drains heat from the finger through the skin), so that we feel cool a material with large thermal diffusivity (which drains heat at high rate) and we feel warm a material with low thermal diffusivity (which drains heat at low rate).

The same concept is exploited in the proposed tactile transducer. A temperature gradient between the exploring finger and the object is created by electrically heating the resistive layer which backs part of the epidermal sensing layer up to a temperature (usually about 30° C.–35° C.) higher than room temperature. By reproducing the pyro-electric sensing capability of the human skin, the epidermal sensor detects the rate of the heat flow going from the resistive layer across the sensor itself to the pressed object.

A further feature of the present invention lies in that heat diffusion from the heating layer toward the deep thermal sensing layer is limited by the presence of a thick, intermediate layer of compliant material. Such compliant material is preferably rubber. Finally, after the object has been grasped in the way that is decided on the basis of previous tactile exploration, contact pressure is measured and care is exerted in order to prevent object slippage. However, the tactile sensor also provides means to assess slippage. Then, the control unit can actuate the hand to achieve stronger grasp.

All this complex set of information is obtained by exploiting in different ways the piezo- and pyro-electric properties of polymer materials arranged in a layered structure. Large band-width operation of polymer transducers is also used to obtain some of these information. Suitable amplification electronics is used to provide the control unit with signals to be processed. To this aim different electronic units have been devised as described later.

DETAILED DESCRIPTION OF THE PREFERRED EMBODIMENTS

Basically, each of the various embodiments of the device according to the present invention consists of a triple layer structure, including a thin superficial (epidermal) sensing layer 1, a deep (thermal) sensing layer 2 and an intermediate layer 3 of compliant material, interposed between layers 1,2. Both the superficial and deep sensing layers 1,2 include a ferroelectric polymer transducers. In all the embodiments, the tactile sensor is rigidly backed. In one embodiment, as that illustrated in FIG. 1 of the accompanying drawings, the sensor is backed by a flat, rigid printed circuit board. In other embodiments, the printed circuit structure is flexible and is supported by a properly shaped, rigid, curved structure of an artificial fingertip.

Figure 1:
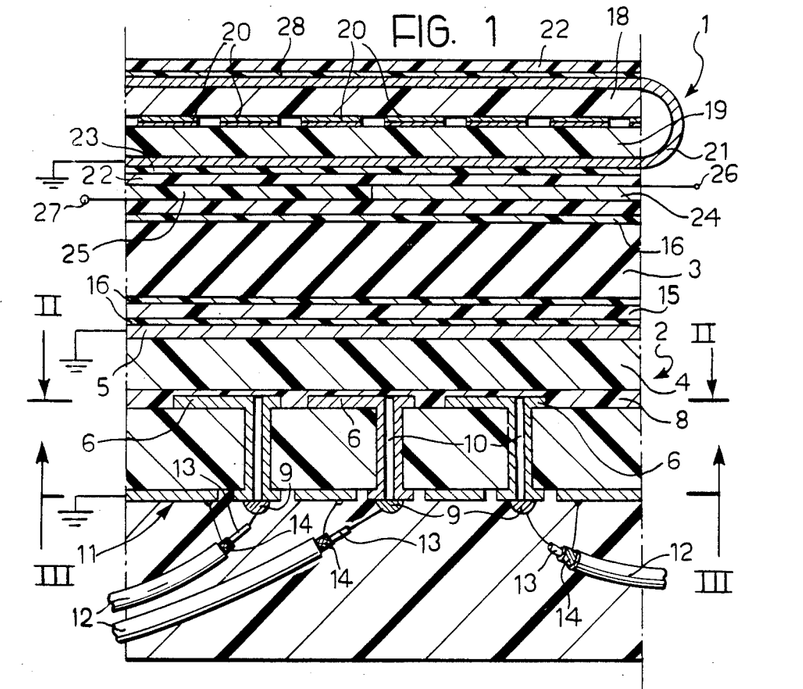
FIG. 1 is a cross sectional view of a first embodiment of a composite tactile sensing device according to the present invention.

Referring to the first embodiment of the invention which is illustrated in FIG. 1, the deep sensing layer 2 includes a film 4 of a ferroelectric polymer material (e.g. $PVF_2$) having a thickness of about 100 microns. Since the polymer film works primarily in thickness mode (electrical charge is generated due to compression of the film across its thickness), it is convenient to use a relatively thick film, featured by large voltage sensitivity. However, the thickness of the polymer film can range between 10 microns and 1 mm.

Figure 2:
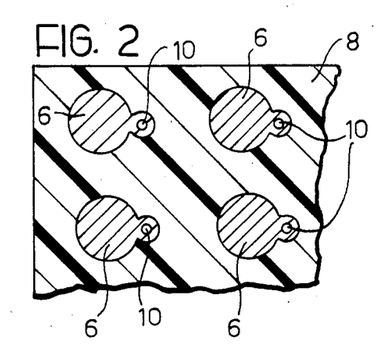
FIGS. 2, 3 show cross-sectional views taken along lines II—II and III—III of FIG. 1.

The side of the polymer film 4 which faces towards the intermediate layer 3, i.e. the upper face of film 4, with reference to FIG. 1, is uniformly metallized by a layer 5 which forms a grounded electrode of the deep transducer 2. A number of electrodes 6 (see also FIG. 2) are in contact with the lower face of the polymer film 4. Such electrodes 6 are provided on the upper face of a printed circuit board 7 which rigidly backs the polymer film 4. The latter is bonded to the printed circuit board 7 by means of a thin layer 8 of non-conductive glue (for instance epoxy, or contact cement). The electrodes 6 are disposed according to a matrix-like array. For instance, 10×20 circular elements are located in a 10 mm×20 mm area. Each electrode 6 is electrically connected to a respective metal pad 9 through a metallized hole 10 provided in the printed circuit board 7. The printed circuit board 7 can be made of various materials, such as reinforced fiberglass, and has a thickness ranging from about 0.5 mm to 2 mm, for example.

Figure 3:
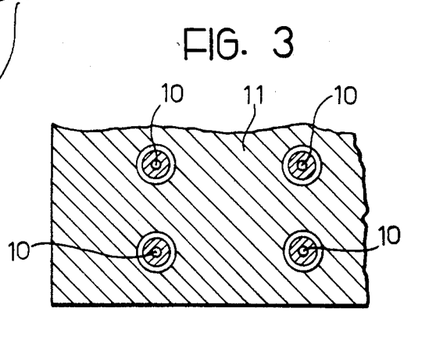

A distributed grounded electrode 11 (see also FIG. 3) is deposited on the bottom side of the printed circuit board 7 in order to provide better electrical shielding and to prevent cross-talk between contiguous electrodes 6. Individual microcoaxial cables 12 (e.g. having an outer diameter of 0.6 mm) are provided, each having an inner conductor 13 soldered to a respective pad 9 and an outer shield conductor 14 soldered to the grounded electrode 11. Soldering can be carried on either by conventional tin solder, or with ultrasound. Room temperature, conductive epoxy can be used to reduce thermally induced deformation of the printed circuit board 7 which may occur during conventional soldering.

The bundle of microaxial cables 12 is partly embedded into the transducer body by means of filling epoxy. The resulting structure, which backs the overall sensor, is machined in order to obtain a regular parallelepiped which can be easily fitted to robot grippers. The ends of the cables are connected to the electronic unit. When the piezo-electric polymer film 4 is pressed through the upper layers, electrical charge is developed on its surfaces. The charge produced on the bottom side of the film (which remains locally since there is no uniform metallization on such surface) is transferred capacitively, through the thin layer 8 of non conductive glue, to the electrodes 6 of the printed circuit board 7.

One advantage of this solution is that the shape, dimension and configuration of the deep sensor is largely free and different arrays of electrodes can be defined by preparing different printed circuit boards. The polymer film 4 is prepared by conventional preparation process (i.e. stretching and poling) and can be easily removed by the printed circuit in case of damage. The deep sensor 2 is intended to detect only "tactile images", i.e. graded contact pressure exerted by the touched object on the tactile sensor. Therefore, it is recommended to use "voided", relatively thick polymer film for this particular sensor. The voided material is prepared in such a way as to obtain a fibrillar structure with large percentage of voids: the resulting polymer film has about the same piezo-electric activity and about 0.1 times the pyro-electric coefficient of a conventional $PVF_2$ material, and it is, therefore, much less sensitive to the influence of temperature variations. The metal layer 5 may be applied by any conventional technique (e.g. spraying, vacuum coating, painting, etc.) and may be made of a metal such as aluminium, nichel-chrome, silver, copper, gold, etc. Such metal layer 5 is covered by a thin protective layer 15 of electrically insulating plastic material, such as Mylar.

According to the invention, the intermediate layer 3 of compliant material is preferably made of rubber. The purpose of the layer 3 is twofold: it insulates the $PVF_2$ deep sensor 2 from sudden superficial temperature variations which can alter correct contact pressure reading and it provides the sensing device with some elastic compliance that is useful for better object grasping.

The choice of the rubber material and the thickness of layer 3 can be optimized in order to obtain a correct compromise between the aforementioned needs (thermal insulation and compliance) and the resulting effect on the sensitivity of the deep sensor 2. We have discovered that a natural rubber having a modulus of elasticity of about $10^6$ Pa and a thickness of 1.4 mm enhances sensor sensitivity by a factor of about 1.1, while crosstalk between the electrodes is also increased by 2 to about 4%. This effect is due to the fact that the rubber layer determines some stretching effect in the $PVF_2$ deep sensor 2 and, as a consequence, it can enhance sensor sensitivity. On the other hand, rubber squeeze also increases mutual interactions between contiguous electrodes.

In the embodiment shown in FIG. 1, the rubber layer 3 has no sensorial function and thus, its composition and thickness can be optimized in order to obtain good mechanical properties (large yield strength, linearity, etc.) and best possible effect on the $PVF_2$ deep sensor performance. Reference numeral 16 designates thin layers of non conductive glue.

The rubber layer 3 is covered by a thin plastic film 31 (e.g. Mylar). The epidermal ferroelectric polymer transducer 1 has a bilaminate structure (i.e. it is made of two thin $PVF_2$ films 18, 19, bonded to each other in side by side relation). This structure allows better electrical shielding and, if the individual films are properly oriented, the resulting electrical charge is doubled. The sensor is fabricated by depositing a few metal electrodes 20 on one side of a $PVF_2$ film and a uniform metallization 21 on the other side and then applying a strong poling field between each individual electrode and the common ground electrode. By this process, selected sensitive areas are obtained on the same polymer film. The two films 18, 19 are prepared in this way and then bonded to each other in side by side relation, so that the individual electrodes 20 stay in the inner part of the sandwich structure. The inner conductors of microcoaxial cables (not shown) are connected to each electrode. The shield outer conductors of the microcoaxial cables are bonded to the outer electrode of the bilaminate sensor. After this process, a thin protective plastic film 22 is bonded to both sides of the bilaminate sensor 1, by interposition of a thin layer of non conductive glue 23. Then, a layer 24 of resistive paint or ink (e.g. graphite coating) is deposited onto some selected areas of the sandwich structure in order to back some of the electrodes 20.

The purpose of this layer is to heat, when connected to a suitable power supply, the sensor elements which will be then used, exploiting their pyro-electric sensitivity, to classify different materials on the basis of their thermal properties. Epoxy resin 25 fills the spaces which are not occupied by the resistive material. For example, if a layer of graphite paint having a thickness of 25 microns is sprayed on parts of this bilaminate sensor and conventional monopolar wires 26, 27 are connected to the opposite sides of the graphite layer 24 (along a longitudinal direction), a typical value of 1,200 ohms is obtained (depending upon the dimension of the graphite area). In this condition a voltage of 18 volts is needed to dissipate an electric power of 270 mW, which can determine sensor heating up to a temperature of about 30°-35° C.

Figure 10:
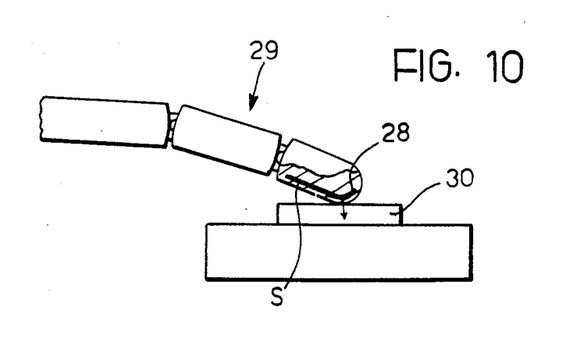
Figure 11:
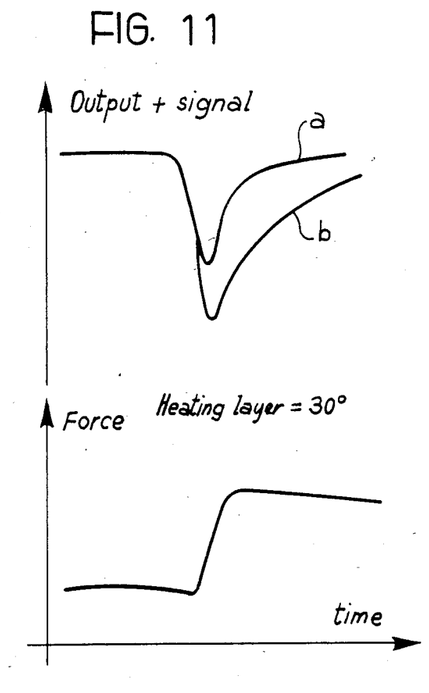
FIGS. 11, 12 shows diagrams which illustrates experimental results obtained by the device according to the invention.
Figure 12:
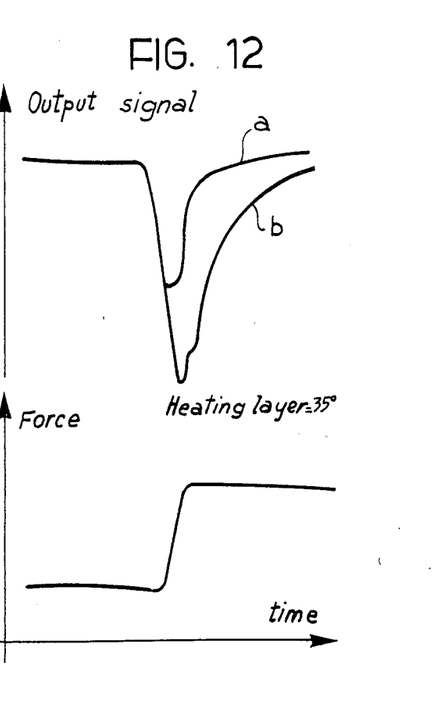

As diagrammatically shown in FIG. 10, a tactile sensing device S according to the invention is located on the fingertip 28 of an articial finger 29 and is pressed against an object 30. The temperature gradient between the sensor S and the object 30 (at room temperature) causes heat to flow through the PVF$_2$ superficial sensor. Due to the pyro-electric effect, the sensor measures different signals when objects made of high thermal diffusivity materials (such as, for example, brass) and low thermal diffusitivity materials (such as, for example, nylon) are touched. An example of the signals detected when the finger 29 is pressed with the same force against two different objects and the sensor is heated by the heating layer up to a temperature of 30° C., is shown in FIG. 11. In this figure, the bottom diagram shows the force variation with the time, while the top diagram shows the signal variation for nylon (line a) and brass (line b). FIG. 12 shows corresponding diagrams for a heating layer temperature of 35° C. As visible, in this case the difference between the detected signals for the two materials is even larger.

The sensitivity of the pyro-electric polymer sensor is so high that materials having very similar thermal properties (e.g. different plastics or different metals) can be discriminated among themselves.

The final step of the assembly of the tactile transducer shown in FIG. 1 is that of bonding the bilaminated epidermal PVF$_2$ sensor onto the rubber layer. When the tactile sensor is rubbed across an object, the superficial sensing layer 1 is able to detect surface features of the object, such as profile or texture. In this operation, the piezo-electric sensitivity to strain and microvibration of the thin superficial polymer film is exploited. Moreover, when objects made of materials having different hardness are touched, the resulting strain in both sensing layers 1, 2 will be different. Thus, it is possible to identify, qualitatively, materials with different mechanical properties by detecting different signals from the PVF$_2$ sensors. It is noticeable to observe that the strain sensitivity of the superficial PVF$_2$ sensor is usually much larger than the corresponding one of the deep sensor (e.g. 5 times larger).

On the other side, the frequency response of the deep, rigidly backed, PVF$_2$ sensor 2 is comprised between about DC and a few MHz, while the soft backed superficial film sensor 1 has much narrower bandwidth, usually between about DC to a ten hundreds Hz (depending on the elastic properties of the rubber layer).

Finally, when an object is grasped, variations in the grasping force can be detected by both sensing layers. The superficial layer 1 can detect micromovements of the object due to slippage. In this case, slippage is detected by the time shift between the signals read by two contiguous electrodes. On the other hand, the deep sensing layer 2 can also detect object movements as a displacement of the tactile image detected immediately prior to slippage. It is interesting also to notice that tactile images of an object can be obtained by the tactile sensors mounted on the fingers of an artificial hand by means of a suitable control which induces micromovements in the grasping fingers at low frequency (say 0.5–2 Hz).

In this way, the grasping force varies, determining "refreshing" of the tactile images. Such technique is useful to overcome the problems of lack of DC response in piezo-electric sensors, and it also allows slippage to be detected by identifying tactile image location.

In summary, the tactile sensing device configuration depicted in FIG. 1 is capable to measure:
dynamic contact pressure (by means of both sensing layers);
material hardness (qualitatively; by means of either one of the two sensing layers);
surface texture (by means of the superficial sensing layer);
thermal properties (by means of the superficial sensing layer);
slippage (by means of both sensing layers);
tactile images (by means of the deep sensing layer).

Figure 4:
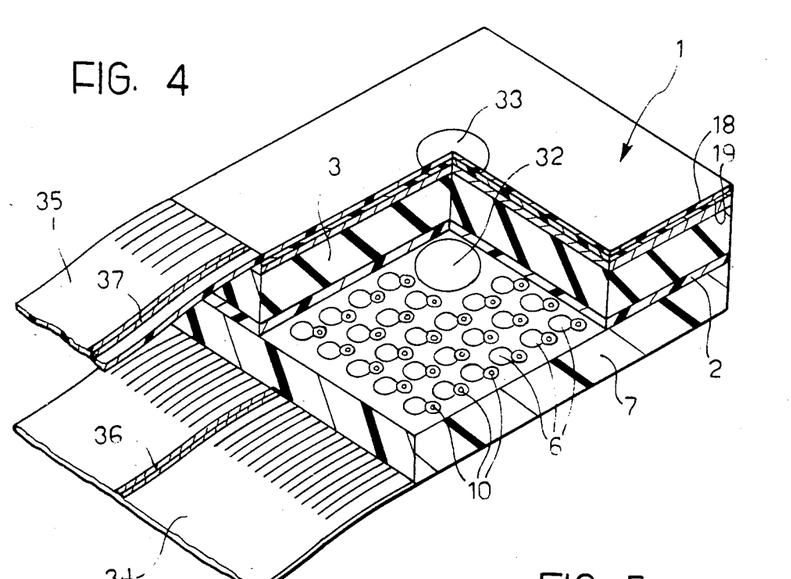
FIG. 4 is a perspective view, partially in cross-section, showing a second embodiment of the device according to the present invention.

FIG. 4 shows a second embodiment of the device according to the invention. In this figure, parts which are common to FIG. 1 are indicated by the same reference numerals. A first difference between the embodiment of FIG. 1 and that of FIG. 4 lies in that the latter is provided with an ultrasonic transducer located within the structure of the sensing device. Such transducer consists of two elements: an emitter 32 of ultrasonic waves, located in correspondence with the electrodes array of the deep sensor, and a receiver 33, which forms part of the superficial sensor 1. Both the US emitter and the US receiver 32, 33 are made of piezo-electric polymer. The emitter may be or not defined by the same technique illustrated for the first embodiment. In either cases (i.e. if the emitter is obtained on the same PVF$_2$ film or if it is made of a different disk, with thickness optimized in order to obtain best transmitting efficiency) it is backed by a relatively thick (say 100–200 microns) metal electrode (not shown), to improve further its efficiency as an ultrasonic emitter.

The concept is the following: the deep emitter 32 emits ultrasonic waves or pulses whose frequency spectrum lies in the MHz range, which cross the rubber layer 3 and are detected by the superficial receiver 33. Suitable electronic circuitry allows the time of flight of the US signal to be detected. Usually, such time of flight can be in the range of a few microseconds. The time of flight can be related to the mutual distance between the emitter 32 and the receiver 33. The obtainable spatial resolution can be in the range of microns. This method, first described by A. A. Schoenberg et al, allows to measure static displacements and static forces. However, the reason why this transducer is introduced within the proposed tactile sensing device lies in that it allows the hardness of the material forming the object to be quantitatively measured. To this end, the object to be detected is grasped between two sensorized fingers and pressed with a predetermined force. The compression of the object is given by the relative displacement of the fingers, which is measured by external transducers in the robotic hand, minus the compression of the two compliant tactile sensors. The static compression of the compliant part of both tactile transducers is measured by the built-in ultrasonic transducers, so that the compression of the objects and its strain can be calculated. On the other hand, the measurement of the grasping force (also provided, usually, by conventional external transducers mounted in the robotic hand) allows together to the information provided by the deep sensor 2, an average value of the stress on the object to be measured. In fact, this value can be derived from the measurement of the area on which the grasping force is exerted, as detected through tactile images.

Therefore, the true value of the Young's modulus of the material forming the object can be calculated from the relationship between stress and strain. Moreover, viscoelasticity of the material can be measured dynamically, by varying the grasping force and monitoring stress-strain relationship. If hysteresis occurs between the compression and releasing phases, this indicates that the object has some degree of viscoelasticity. Such technique, which represents a substantially improvement compared to that illustrated in U.S. Pat. No. 4,250,894, can be extremely useful in different fields, such as agriculture (e.g. to assess fruit ripeness) and medicine (e.g. for automatic palpation).

Figure 5:
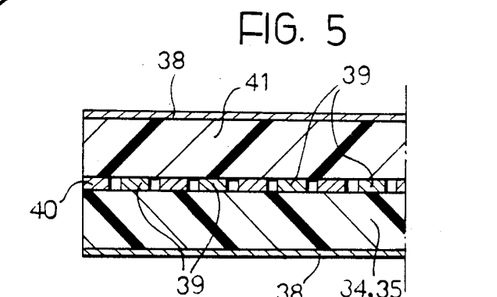
FIG. 5 is a cross-sectional view showing a flexible, multipath coaxial cable for use in the device according to the invention.

The second difference of the embodiment of FIG. 4 with respect to that of FIG. 1 lies in the use of flexible printed circuits for the various electrical connections. The printed circuit connectors are indicated with reference numerals 34, 35 in FIG. 4. They can be prepared in the shape of laminated ribbons in which individual paths 36, 37 are provided for the "hot" wires connected to each electrode, such paths being separated and electrically shielded from each other by distributed grounded electrodes. Referring to FIG. 5, each flexible printed circuit is uniformly metallized on one side (see layer 38) and carries hot wires 39 and a shield electrode 40 on its opposite side. In correspondence with this latter side, another flexible printed circuit 41 is bonded, so as to obtain a sort of flat, coaxial cable, as shown in FIG. 5. The conductive path 39 can be easily deposited by means of conventional silk-screening techniques. The use of the flexible printed circuit has some advantage with respect to the microcoaxial cables in terms of weight, simplicity and cost.

Figure 6:
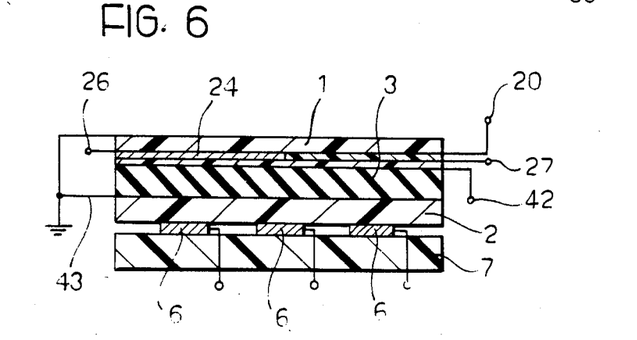
FIG. 6 is a cross-sectional view showing a third embodiment of the device according to the present invention.

FIG. 6 of the annexed drawings diagrammatically shows a third embodiment of the device according to the invention which differs from that of FIG. 1 basically for it includes a layer 3 of pieroresistive rubber. Electrodes 42, 43 are provided, either on both sides of the piezo-resistive rubber or "spaced", on the same side, and a conventional electronic circuitry allows to measure variations of electrical resistance and to relate such variation to rubber deformation. This is a technique which is known from some of the above mentioned prior art documents.

It is possible, by this method, to detect static sensor deformation. In this embodiment, therefore, the rubber layer 3, whose thickness can be comprised for instance between 0.5 and 2 mm, has the role of measuring static signals, besides providing the same degree of compliance and thermal shielding of the deep sensor. Since the major limit of piezoresistive rubber sensors is their poor frequency response and the major limit of piezo-electric sensors is their lack of static response, the two sensors materials can ideally co-operate to give large bandwidth response to the whole tactile transducer.

One single sensor or a few sensing elements can be defined by proper electrodes on the rubber layer, since spatial resolution is given by the deep $PVF_2$ array.

Figures 7, 8:
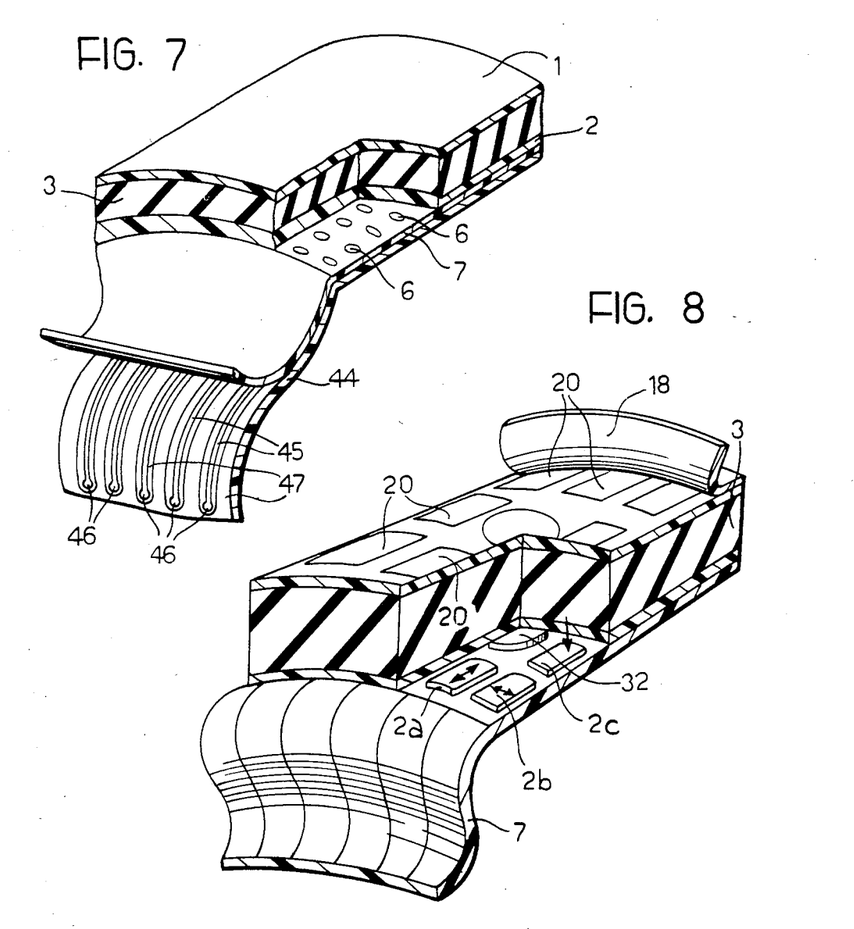
FIG. 7 is a perspective view, partially in cross-section, showing a fourth embodiment of the device according to the present invention.
FIG. 8 is a perspective view, partially in cross-section, showing a fifth embodiment of the device according to the present invention.

FIG. 7 shows another embodiment of the present invention whose major feature is represented by that the printed circuit board 7 is not rigid, as in the case of FIG. 1, but flexible. As in the case of flat cables 34, 35 an array of electrodes 6 is deposited (for instance by silk-screening techniques) on a flexible plastic film and the polymer film 2 is then bonded thereto. Metallized holes (not shown) are also provided to connect each electrode 6 to the bottom side of the flexible printed circuit 7 and to a flat, flexible printed connecting cable 44. As shown in FIG. 7, and similarly to the case shown in FIG. 5, hot paths 45, terminating with connecting pads 46, as well as a distributed ground electrode 47 are deposited on the flexible ribbon-like coaxial cable 44. An advantage of this solution lies in that the whole sensors structure remains moderately flexible and may be adapted to curved shapes, such as that of an artificial finger, the latter being shaped as the human fingertip for easier tactile exploration.

FIG. 8 shows a further embodiment of the present invention. In this figure, parts which are common to the above described embodiments are indicated by the same reference numerals. The main difference with respect to the above described embodiments lies in that the deep sensor is comprised of a number of different polymeric sensing elements such as 2a, 2b, 2c, intended to provide measurements of different components of the contact forces. As generally known, there are polymers (e.g. polymers belonging to the class of polypeptides or, more generally, optically active polymers) which possess such a configuration of the tensor of their piezoelectric constants that they are able to detect only a single component of the force acting on them. Therefore, these polymeric sensors can be very selective and may provide important additional information to the tactile sensor. In the embodiment of FIG. 8, different polymers (e.g. $PVF_2$ and poly-J-benzyl-L-glutamate) are used to detect selected different force components. The electrodes deposited on the flexible printed circuit board 7 are selectively covered with different sensor materials 2a, 2b, 2c in order to obtain detection of different force components in different locations. Since the density of the sensors 2a, 2b, 2c can be very high, the resolution of such measurements can be reasonably good. By using $PVF_2$ sensors, information on the vertical components of the contact force can be obtained. By the polypeptidic sensors the components of the contact force parallel to the plane of the tactile sensor can be also measured. In fact, polypeptidic sensors can be oriented in order to measure such components, as illustrated by the arrows in FIG. 8. The orientation of the polymeric material determines the force component that can be measured by the sensor. Such orientation can be induced, during polymer preparation, either by mechanical means or by the effect of a strong magnetic field.

Figure 9:
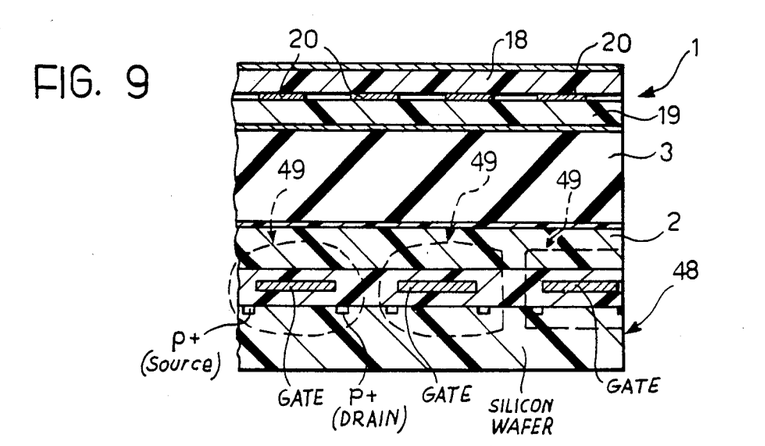
FIG. 9 is a cross-section showing a sixth embodiment of the device according to the present invention, FIG. 10 diagrammatically illustrates the concept exploited in the device according to the invention to identify different materials by measuring their thermal properties.

FIG. 9 of the annexed drawings shows a further embodiment which differs from the above described embodiments in that the deep sensing layer 2 is backed by an integrated circuit 48 designed so as to have an array of FET input amplifiers 49 corresponding to the electrodes array of the above described embodiments. In this case, the array of electrodes which defines the array of sensing elements of the above described embodiments is replaced by an array of electrodes which represent the gates of MOSFET elements. By this technique, previously described by other investigators for different application, (see "Integrated silicon-$PVF_2$ acoustic transducer arrays" by Robert G. Swartz et all, IEEE transactions on electron devices, vol. ed-26, No. 12 December 1979), the charge generated by each piezo-electric sensor is capacitively coupled to the gate of the MOSFET and modulates, directly, the channel current. Moreover, the integrated circuit can be designed in such a way as to possess circuit elements able to multiplex as well as to amplify the signal from each sensor. Also A/D converters can be included within the integrated circuit structure, along with some degree of signal processing (e.g. preferential sequence in array scanning, or insertion of calibration factors for each individual sensor in order to compensate small sensor-to-sensor sensitivity difference, etc.) performed by a built-in microprocessor. The proposed structure represents a contribution to the complex problem of hierarchical control of different robot functions. In particular, the proposed "smart" tactile sensor, capable of peripheral signal preprocessing, is a valuable approach to the issue of distributed intelligence, a way to reduce central control unit complexity by "filtering" peripheral information and sending relevant information only to the central unit.

Another possible method to obtain an integrated sensor structure is that previously described in "Pyro-electric IR sensor using polyvinylidine fluoride-trifluoro-ethylene polymer film" by Eiso Yamaka, of University of Tsukuba. In this case, the deep sensing layer, instead of being made of $PVF_2$, is obtained by casting a very thin layer of copolymer $PVF_2$-TrFE. After casting from solvent solution on the bottom integrated circuit structure, the sensor is spinned in order to obtain the thin copolymer layer which does not need any mechanical orientation (as $PVF_2$ does) for being piezo-electric. After depositing a metal electrode on the upper side of the copolymer film a strong electric field is applied between the bottom electrodes and the upper common electrode. The film is therefore selectively and permanently poled.

The shape of the tensor of the piezo-electric constants of the $PVF_2$-TrFE copolymer is such that the sensors operate as the $PVF_2$ film sensors: being the integrated circuit rather stiff, the copolymer sensors operate primarily in thickness mode.

Figure 13:
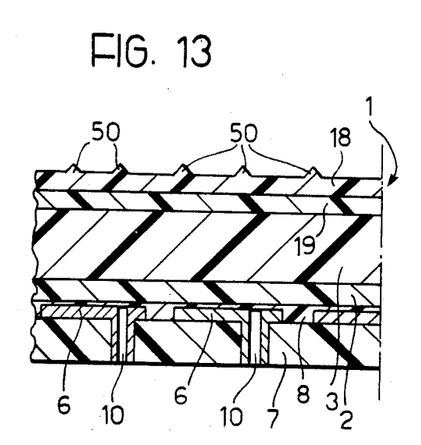
FIG. 13 is a cross-sectional view showing a further embodiment of the device according to the present invention.

A variant which may be applied to all the above described embodiment is illustrated in FIG. 13. In this case, the superficial sensing layer 1 is shaped on its upper surface by means of a thermoforming process so as to obtain small and dense ridges 50 which should reproduce the papillary ridges of human fingertips. Ridges 50 are aimed to increase the strain in the sensing elements of the superficial polymer sensor layer 1. Either the upper film 18 or the bilaminate sensor 1 or the protective plastic film 22 (see FIG. 1) can be thermoformed in order to obtain ridges, which act as levers to amplify superficial strain and to induce larger strain in the sensors.

Figure 14:
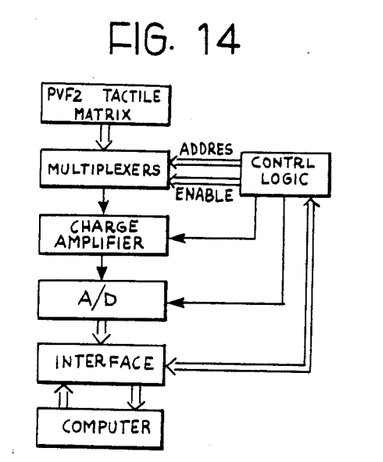
FIG. 14 shows a diagram of the electronic unit which is used to process the signals obtained from the various sensing elements of the device according to the invention.

A diagram of the electronic circuitry to be connected to the tactile deep matrix sensor is shown in FIG. 14. The outputs of the sensors are sent to analogic multiplexers which are operated under a control logic, driven by the central computer. After multiplexing, the signals are sent, sequentially, to a charge amplifier and then converted into digital signals. The digital signals are then fed, through a suitable interface, to the central computer and reconstructed.

Figure 15:
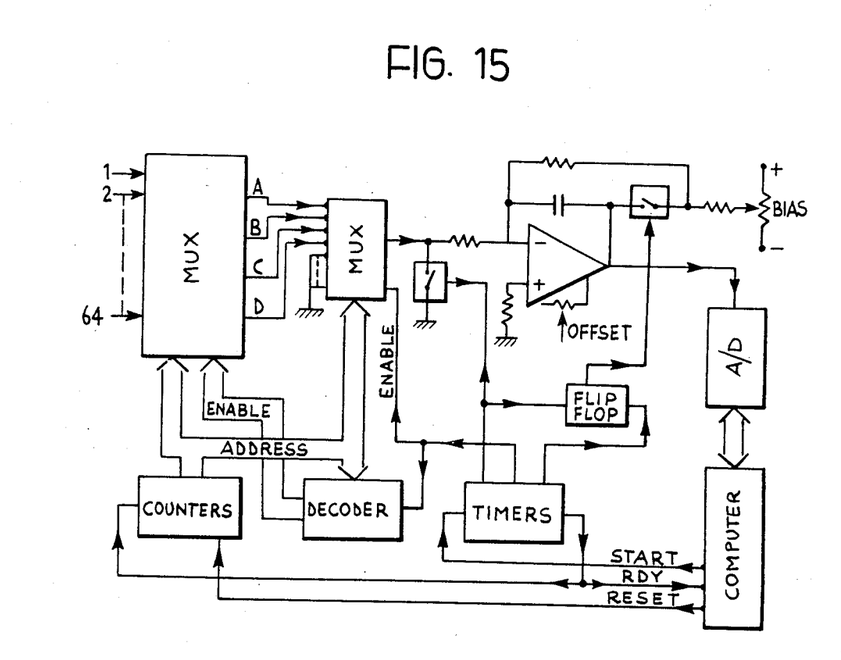
FIG. 15 shows a more detailed diagram of the electronic circuitry used to process the signals obtained from the deep sensing layer forming part of the device according to the invention.

FIG. 15 shows more in detail the diagram of the electronics used for a set of 64 sensing elements.

While the invention has been particularly shown and described with reference to some preferred embodiments thereof, it will be understood by those skilled in the art that various changes in form and details may be made therein without departing from the spirit and the scope of the invention.

What is claimed is:

1. A composite tactile sensing device, comprising
   a superficial (epidermal) sensing layer, including a first ferroelectric polymer transducer,
   a deep (dermal) sensing layer, including a second ferroelectric polymer transducer, comprising a film of ferroelectric polymer material and a matrix-like array of electrodes connected to the face of said film which is opposite to the epidermal sensing layer, and
   an intermediate layer of compliant material, interposed between said epidermal and dermal sensing layers.

2. A sensing device as set forth in claim 1, wherein said compliant material is rubber.

3. A sensing device as set forth in claim 2, wherein said rubber is piezo-resistive rubber conductive and is provided with electrodes.

4. A sensing device as set forth in claim 1, wherein said matrix-like array of electrodes is defined by a printed circuit structure, on which said dermal sensing layer is bonded.

5. A sensing device as set forth in claim 4, wherein said printed circuit structure has a rigid configuration.

6. A sensing device as set forth in claim 4, wherein said dermal sensing layer is bonded onto said printed circuit structure by means of a layer of non-conductive glue.

7. A sensing device as set forth in claim 4, wherein each individual electrode of the printed circuit structure is located on the face thereof which is in contact with said film of ferroelectric polymer material, metal pads being provided on the opposite face of the printed circuit structure, which are connected to said electrodes by metallized holes formed in the printed circuit structure.

8. A sensing device as set forth in claim 7, wherein a number of microcoaxial cables are provided, each having an inner conductor connected to a respective one of said metal pads and an outer shield conductor, said printed circuit board being provided with a grounded distributed electrode to which said outer shield conductors are connected.

9. A sensing device as set forth in claim 7, wherein said metal pads are connected to conductors forming part of the flexible printed circuit structure.

10. A sensing device as set forth in claim 4, wherein said printed circuit structure is a flexible printed circuit structure.

11. A sensing device a set forth in claim 10, wherein said flexible printed circuit structure is provided with a flexible printed circuit connecting cable including conductors connected to the electrodes of the flexible printed circuit.

12. A sensing device as set forth in claim 1, wherein said film of ferroelectric polymer material has a grounded electrode on its side facing the intermediate layer.

13. A sensing device as set forth in claim 1, wherein said ferroelectric polymer material is polyvinylidine fluoride.

14. A sensing device as set forth in claim 1, wherein a protective layer of plastic film is interposed between said dermal layer and said compliant layer.

15. A sensing device as set forth in claim 1, wherein a protective layer of plastic material is interposed between said layer of compliant material and said epidermal layer.

16. A sensing device as set forth in claim 1, wherein said first ferroelectric polymer transducer has a bilaminate structure.

17. A sensing device as set forth in claim 1, wherein a heating layer is provided, said heating layer including portions of resistive material which are interposed between said epidermal layer and said layer of compliant material in correspondence with selected areas.

18. A sensing device as set forth in claim 1, further including an ultrasonic transducer, comprising an ultrasonic emitter and an ultrasonic receiver forming part of the dermal and epidermal sensing layers, respectively.

19. A sensing device as set forth in claim 18, wherein said emitter and receiver are made of ferroelectric polymer material.

20. A sensing device as set forth in claim 19, wherein said emitter and said receiver are made of $PVF_2$.

21. A sensing device as set forth in claim 1, wherein the outer surface of the epidermal sensing layer is formed with a number of ridges.

22. A composite tactile sensing device, comprising
   a superficial (epidermal) sensing layer including a first ferroelectric polymer transducer, and
   a deep (dermal) sensing layer, including a plurality of ferroelectric polymer transducers adapted to detect difference force components and located according to a matrix-like array.

23. A sensing device as set forth in claim 22, wherein said ferroelectric polymer transducers of the deep sensing layer include sensors of $PVF_2$ adapted to detect vertical components of the contact forces, and polypeptidic sensors, adapted to detect components of the contact forces which are parallel to the plane of the layer.

24. A sensing device as set forth in claim 22, wherein the outer surface of the epidermal sensing layer is formed with a number of ridges.

25. A composite tactile sensing device, comprising
   a superficial (epidermal) sensing layer, including a first ferroelectric polymer transducer,
   a deep (dermal) sensing layer, including a second ferroelectric polymer transducer, comprising a film of ferroelectric polymer material,
   an intermediate layer of compliant material, interposed between said epidermal and dermal sensing layers, and
   an integrated circuit structure backing said deep sensing layer and including a matrix-like array of FET input amplifiers.

26. A sensing device as set forth in claim 25, wherein said film of ferroelectric polymer material of the deep sensing layer is made of copolymer $PVF_2$-TrFE.

27. A sensing device as set forth in claim 25, wherein the outer surface of the epidermal sensing layer is formed with a number of ridges.

* * * * *